United States Patent [19]
Guillory et al.

[11] 3,867,342

[45] Feb. 18, 1975

[54] ULTRAVIOLET STABILIZED POLYOLEFINS

[75] Inventors: Jack P. Guillory, Bartlesville, Okla.; Ralph S. Becker, Houston, Tex.; William B. Hughes, Bartlesville, Okla.

[73] Assignee: Phillips Petroleum Company, Bartlesville, Okla.

[22] Filed: Mar. 4, 1974

[21] Appl. No.: 447,526

[52] U.S. Cl. .................. 260/45.85 S, 260/45.95 C
[51] Int. Cl. ............................................ C08f 45/58
[58] Field of Search ............... 260/45.85 S, 45.95 C

[56] References Cited
UNITED STATES PATENTS
3,692,738   9/1972   Mathis et al. .................... 200/45.75

*Primary Examiner*—V. P. Hoke

[57] ABSTRACT

The addition of a minor amount of a 2-hydroxy-4-alkoxythiobenzo-phenone or 2-mercapto-4-alkoxythiobenzophenone to olefin polymers produces an olefin polymer composition resistant to degradation by ultraviolet light.

10 Claims, No Drawings

ULTRAVIOLET STABILIZED POLYOLEFINS

BACKGROUND OF THE INVENTION

This invention relates to stabilized polymers. More particularly it relates to the stabilization of monoolefin polymers against the deterioration and physical properties resulting from exposure to ultraviolet light. In one of its aspects, the invention relates to stabilized compositions of olefin polymers.

In recent years, polymers of monoolefins have found extensive use in the preparation of a wide variety of manufactured products. It is well known that exposure to sun light or other sources of ultraviolet radiation cause a degradation of olefin polymers which is evidenced by a loss in molecular weight of the polymer, a darkening in color, and a decrease in such physical properties as tensile strength to a point that mechanical failure can occur. A variety of stabilizers have been used in the prior art to provide protection against deterioration of monoolefin polymers on exposure to ultraviolet radiation. We have found that the addition of 2-hydroxy-4-alkoxythiobenzophenone or 2-mercapto-4-alkoxythiobenzophenone to a monoolefin composition will effectively stabilize the composition against ultraviolet light deterioration.

It is therefore an object of this invention to provide a method for stabilizing monoolefin polymers against the deterioration caused by exposure to ultraviolet radiation. It is also an object of this invention to provide a composition of monoolefin polymers stabilized against deterioration on exposure to ultraviolet radiation.

Other aspects, objects and the advantages of this invention will be apparent to one skilled in the art upon studying the specification and the appended claims.

SUMMARY OF THE INVENTION

According to the invention, a stabilizing amount of a 2-hydroxy-4-alkoxythiobenzophenone or 2-mercapto-4-alkoxythiobenzophenone is added to a polymer of a monoolefin to provide an olefin polymer stabilized against deterioration in the presence of ultraviolet radiation.

The UV stabilizers are expressed generically as follows:

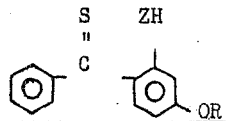

wherein Z is oxygen or sulfur and R is an alkyl group containing from 1 to 30 carbon atoms. Typical alkyl radicals include methyl, ethyl, propyl, amyl, hexyl, heptyl, octyl, decyl, dodecyl, octadecyl, eicosyl, pentacosyl, triacontyl and the like. Exemplary compounds are:

2-hydroxy-4-n-octyloxythiobenzophenone
2-hydroxy-4-methoxythiobenzophenone
2-hydroxy4-n-dodecyloxythiobenzophenone
2-hydroxy-4-n-eicosyloxythiobenzophenone
2-hydroxy-4-n-triacontyloxythiobenzophenone
2-mercapto-4-ethoxythiobenzophenone
2-mercapto-4-n-hexyloxythiobenzophenone
2-mercapto-4-n-octyloxythiobenzophenone
2-mercapto-4-t-butyloxythiobenzophenone
2-mercapto-4-n-pentacosyloxythiobenzophenone
and the like.

The 2-hydroxy-4-alkoxythiobenzophenones are prepared from the corresponding 2-hydroxy-4-alkoxybenzophenones by treating the latter compounds with hydrogen sulfide and hydrogen chloride in an alcoholic medium. The 2-mercapto compounds are formed from the corresponding 2-hydroxy-4-alkoxythiobenzophenones after the method of Newman & Karnes described in J. Org. Chem. 31, 3980 (1966). In this method, the 2-hydroxy compound is treated with a dialkylthiocarbamoyl chloride, the resulting compound is isolated and heated to rearrange the -OCSNR$_2$ group to the -SCONR$_2$ group. The resulting product is hydrolyzed under alkaline conditions and the o-thiohydroxy derivative is recovered by acidifying the solution and isolating the product. The reactions are schematically shown as follows:

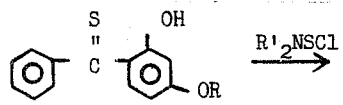

R' is an alkyl radical from 1-2 carbon atoms

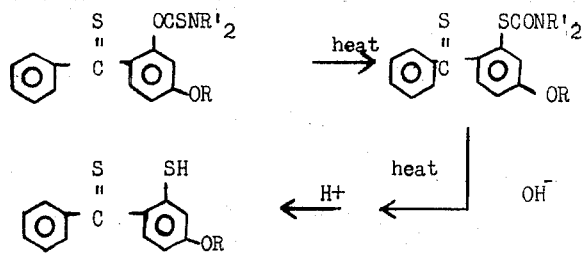

It is well known that in the necessary processing of polyolefins thermal stabilizers must be added. Some polyolefins such as polypropylene are best thermally stabilized with a combination of two thermal stabilizers. These thermal stabilizers generally act independently of a UV stabilizer added to the composition, although sometimes synergistic or antagonistic combinations are found to exist. Synergism and antagonism are, by definition, purely empirical phenomena. No attribution of enhanced performance is made using the 2-hydroxy-4-alkoxythiobenzophenones or 2-mercapto-4-alkoxythiobenzophenones of this invention in conjunction with the antioxidant materials listed below.

Typical antioxidants (thermal stabilizers) to use with the UV stabilized polymers of the instant invention are hindered phenols known to the art selected from the group consisting of 2,6-di-t-butyl-4-methylphenol, octadecyl[3-(3,5-di-t-butyl-4-hydroxyphenyl)] propionate, di-n-octadecyl(3,5-di-t-butyl4-hydroxybenzyl)-phosphonate, tetrakis[methylene(3,5-di-t-butyl-4--hydroxyhydrocinnamate ] methane and 1,3,5-trimethyl-2,4,6-tris(3,5-di-t-butyl-4-hydroxybenzyl) benzene.

Another sulfur-containing thermal stabilizer can also be used in the polymeric compositions. The stabilizer is a diester of beta, beta'thiodipropionic acid

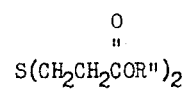

where R'' is an alkyl radical having 8 to 18 carbon atoms. Such radicals include octyl, nonyl, decyl, undecyl (lauryl), tridecyl, pentadecyl, octadecyl (stearyl) and the like. Presently preferred diesters are dilauryl- 3,3'-thiodipropionate and distearyl-3,3'-thiodipropionate.

Suitable polymers stabilized by the additives of the instant invention are the normally solid polymers of aliphatic l-olefins containing from 2–10 carbon atoms per molecule having no branching nearer the double bond than the 4-position. Example of such polymers include the homopolymers of ethylene, propylene, 1-butene, etc., the copolymers of ethylene with propylene, 1-butene, 1-hexene, 1-decene, etc., and combinations thereof. The polymers are prepared according to methods known in the art, for example as disclosed and claimed in U.S. Pat. No. 2,825,721 to John P. Hogan et al, U.S. Pat. No. 3,475,517 to S. Renaudo and U.S. Pat. No. 3,502,634 to Joachim Stedefeder et al.

The antioxidants and UV stabilizers are used in the following amounts in parts additive per 100 parts polymer by weight (php):

|  | bread (php) | preferred (php) |
| --- | --- | --- |
| UV stabilizer | 0.05–2.5 | 0.1–1.5 |
| hindered phenol | 0.002–2.0 | 0.02–0.5 |
| thiodipropionate | 0.05–2.0 | 0.1–1.0 |

The broad ranges stated above state as a lower limit the smallest amount of stabilizing material known to show a detectable effect on the composition. The figure used as an upper limit is the largest amount that will produce a practical enhancement of the stabilizing effect. Amounts of stabilizer above this range while not decreasing the effectiveness of the stabilizer do not further enhance the effectiveness of the stabilizer. The preferred ranges as stated above delineate the limits within which the most beneficial results of stabilization are effected.

The additives are admixed with the polymer by any conventional method known in the art. For example, the additives can be added in the form of powders, solutions or slurries to polymer pellets or polymer powder and the mixture is tumbled or stirred to distribute the additives. Following this treatment any solvent used is removed by evaporation and the blend is extruded and pelletized. Alternately, the additives can be mixed with the molten polymer as it is worked in an extruder, roll mill, Banbury mixer, Brabender mixer, and the like.

Other additives including processing aids, i.e., calcium stearate, dyes, pigments, plasticizers, slip agents and other antioxidants and UV stabilizers can also be added, if desired. The only requirement is that such additives have no antagonistic effects on the polymeric compositions.

EXAMPLE I

Synthesis of 2-hydroxy-4-n-octyloxythiobenzophenone was accomplished as follows. A mixture of 5.0 g of 2-hydroxy-4-n-octyloxybenzophenone, 4.55 g of hydrogen sulfide, 3.30 g of hydrogen chloride, and 50 ml. of ethanol was stirred at room temperature, i.e., 25°C., for 93 hours in a Fisher-Porter bottle. The resulting dark red solution was concentrated in a stream of nitrogen. Orange crystals precipitated which were collected by filtration and dried in vacuo. The orange crystals weighed 3.18 g (61 percent yield) and melted at 36°–37°C. Analysis showed, calculated for $C_{21}H_{26}O_2C$, 73.6 percent, H, 7.7 percent. Found: C, 73.6 percent, H, 7.9 percent. The infrared spectrum showed the C-S stretching vibration at 1211 $cm^{-1}$.

Evaporation of the filtrate yielded an additional crop of orange crystals weighing 0.51 g (11 percent) which melted at 33°–34°C.

EXAMPLE II

The following additives were mixed with polypropylene characterized as having a nominal melt flow of four (ASTM D 1238-62T, condition L) and an optically determined melting point of 340F. To 100 parts by weight polypropylene in each sample was added 0.1 part by weight tetrakis[methylene(3,5-di-t-butyl-4-hydroxyhydrocinnamate] methane, 0.2 part by weight distearyl-3,3'-thiodipropionate and 0.1 or 0.2 part by weight of the UV stabilizer used. The disteraryl were mixed and pressed into a 2 mil film and 20 mil sheet. Specimens were cut from these and tested in a XW Weather-Ometer (carbon arc type, Atlas Electric Devices Co.) and a black light/sunlamp device. The latter device comprises 10, 20 watt black light fluorescent tubes and 10,20 watt sunlamp fluorescent tubes mounted vertically in alternate fashion to form a central core. The tubes are about 1 inch apart. A rotatable jacket surrounds the core (no top or bottom) and the samples are mounted on the inside of the jacket so that the distance between samples and lights is about 3 inches.

Specimens about 3 inches long and ⅜ inch wide are used in the test and they are secured to the mounting jigs such that about 2½ inches of the specimens hang downward untouched. The specimens are manually flexed daily in a 180° rolling bend test. Failure is indicated by breaking and time to failure in hours is the average time of 5 specimens of each run to break, both in this device and in the Weather-Ometer.

Table 1

| | UV Stabilizer | | Black Light/Sunlamp | | | | XW Weather-Ometer | |
| --- | --- | --- | --- | --- | --- | --- | --- | --- |
| | | | 2 mil film hrs. to | % improvement | 20 mil sheet hrs. to | % improvement | 20 mil sheet hrs. to | |
| Run | php | type | failure | ment | failure | ment | | failure |
| 1 | 0 | — | 99 | — | 116 | — | 154 | — |
| 2 | 0.1 | thio-[a] benzo. | — | — | 541 | 366 | 365 | 137 |
| 3 | 0.2 | do. | 244 | 146 | 1234 | 964 | 512 | 232 |
| 4 | 0.1 | benzo.[b] | 283 | 186 | 597 | 415 | 410 | 166 |
| 5 | 0.2 | do. | 423 | 317 | 1234 | 964 | 416 | 170 |
| 6 | 0.1 | nickel cpd.[c] | 141 | 42.4 | 214 | 84.4 | 376 | 144 |
| 7 | 0.2 | do. | 220 | 122 | 349 | 201 | 558 | 262 |

[a] 2-hydroxy-4-n-octyloxythiobenzophenone
[b] 2-hydroxy-4-n-octyloxybenzophenone
[c] [2,2'-thiobis(4-t-octylphenolato)]n-butylamine-nickel (II) (b and c are commercial UV stabilizers for polyolefins)

The results show, as expected, that as the concentration of UV stabilizer is increased the amount of protection given the polymer is increased. Inspection of the data also reveals that in thin film at 0.2 php, the invention UV stabilizer is intermediate in performance to a nickel stabilizer (worst) and the corresponding 2-hydroxy-4-alkoxybenzophenone(best). In 20 mil sheet, the performance of the invention stabilizer is superior to the corresponding hydroxybenzophenone according to XW Weather-Ometer results and equal in performance to the hydroxybenzophenone in the black light-/sunlamp device. In 20 mil sheet, in comparison to the nickel UV stabilizer, the performance of the invention stabilizer is much superior according to black light/sunlamp results and almost equivalent in performance according to Weather-Ometer results.

EXAMPLE III

The blends were prepared as in Example I except that 0.25 php or 0.50 php UV stabilizer was included in each formulation. The blends were pressed into 5 mil film. Specimens were cut from these and tested in the black light/sunlamp device. The following results were obtained.

Table II

| Run | UV Stabilizer php | type | 5 mil film hrs. to failure |
|---|---|---|---|
| 8 | 0 | — | 149 |
| 9 | 0.25 | thio-benzo. | 492 |
| 10 | 0.50 | do. | 750 |
| 11 | 0.25 | benzo. | 966 |
| 12 | 0.50 | do. | 1567 |
| 13 | 0.25 | nickel cpd. | 365 |
| 14 | 0.50 | do. | 492 |

The results show the invention UV stabilizer to be superior to the nickel compound in all instances. The performance of the invention stabilizer is excellent in comparsion to a well regarded nickel stabilizer. However, in thin films as in Table I, 2-hydroxy-4-n-octyloxybenzophenone gives better results in the black light/sunlamp device.

Reasonable variation and modification are possible within the scope of the foregoing disclosure and the appended claims of the invention the essence of which is that there has been provided a polymonoolefin composition enhanced against deterioration on exposure to ultraviolet light by the addition of a stabilizing amount of a 2-hydroxy-4-alkoxythiobenzophenone or 2-mercapto-4alkoxythiobenzophenone.

We claim:

1. A method for stabilizing an olefin polymer composition against deterioration in the presence of ultraviolet radiation which comprises the addition of a stabilizing amount of 2-hydroxy-4-alkoxythiobenzophenone or 2-mercapto-4-alkoxythiobenzophenone.

2. The method of claim 1 wherein said stabilizing amount is in the range of about 0.05 to about 2.5 parts per 100 polymer by weight.

3. The method of claim 1 wherein the olefin polymer composition also comprises a stabilizing amount of a hindered phenol thermal stabilizer.

4. The method of claim 3 wherein the olefin polymer composition also comprises a stabilizing amount of a thiodipropionate thermal stabilizer.

5. A composition of matter stabilized against deterioration in the presence of ultraviolet radiation comprising an olefin polymer and a stabilizing amount of 2-hydroxy-4-alkoxythiobenzophenone or 2-mercapto-4-alkoxythiobenzophenone.

6. The stabilized composition of claim 5 wherein the olefin polymer is chosen from the group consisting of homopolymers and copolymers of monoolefins containing 2-10 carbon atoms per molecule.

7. The stabilized composition of claim 5 also comprising a stabilizing amount of a hindered phenol thermal stabilizer.

8. Stabilized composition of claim 7 wherein a composition also comprises a stabilizing amount of a thiodipropionate thermal stabilizer.

9. The stabilized composition of claim 5 wherein the amount of 2-hydroxy-4-alkoxythiobenzophenone or 2-mercapto-4-alkoxythiobenzophenone is in the range of about 0.05 to about 2.5 parts per 100 parts polymer by weight.

10. The composition of matter of claim 9 wherein the 2-hydroxy-4-alkoxythiobenzophenone is 2-hydroxy-4-n-octyloxythiobenzophenone, the hindered phenol is tetrakis[methylene(3,5-di-t-butyl-4-hydroxyhydrocinnamate)]methane, and the thiodipropionate is distearyl-3,3'-thiodipropionate.

* * * * *

UNITED STATES PATENT OFFICE
CERTIFICATE OF CORRECTION

PATENT NO. : 3,867,342
DATED : February 18, 1975
INVENTOR(S) : Jack P Guillory, Ralph S. Becker, and William B. Hughes It is certified that error appears in the above-identified patent and that said Letters Patent are hereby corrected as shown below:

Column 6, line 16, after "100" insert -----parts-----

Signed and sealed this 27th day of May 1975.

(SEAL)
Attest:

RUTH C. MASON
Attesting Officer

C. MARSHALL DANN
Commissioner of Patents
and Trademarks